United States Patent [19]

Toth

[11] 4,142,106

[45] Feb. 27, 1979

[54] TRANSFER PRINTING RIBBON ERROR DETECTION SYSTEM

[75] Inventor: Ronald L. Toth, Vestal, N.Y.

[73] Assignee: International Business Machines Corporation, Armonk, N.Y.

[21] Appl. No.: 865,634

[22] Filed: Dec. 29, 1977

[51] Int. Cl. ............ G01N 21/30

[52] U.S. Cl. ............ 250/559; 73/14

[58] Field of Search ............ 73/14; 250/559, 562, 250/571

[56] References Cited

U.S. PATENT DOCUMENTS

| | | | |
|---|---|---|---|
| 3,445,670 | 5/1969 | Westdale | 73/14 |
| 3,890,048 | 6/1975 | Abbondio et al. | 250/559 |

*Primary Examiner*—David C. Nelms

*Attorney, Agent, or Firm*—Paul M. Brannen

[57] ABSTRACT

Errors occurring during the printing of characters in an impact printer using transfer ribbon are detected by scanning the ribbon optically after the printing operation using a slit scanner and analyzing the resulting signals to determine the value of the printed character. This value is compared with the value of the character which was to be printed. If a discrepancy exists, a printing error has occurred.

10 Claims, 3 Drawing Figures

TRANSFER PRINTING RIBBON ERROR DETECTION SYSTEM

BACKGROUND OF THE INVENTION

1. Field of the Invention

This invention relates to error detection systems, and particularly to an improved error detection system for detecting errors in the operation of an impact printer, and still more particularly to an improved error detection system for detecting errors in the operation of an impact printer using a transfer type of printing ribbon.

2. Description of the Prior Art

Prior art methods of checking printer operation have contemplated the checking of type element selection, print hammer operation, and the like, against the electrical signals indicative of the character to be printed. Such arrangements usually provided for the generation of electrical signals indicative of the operation of the printing elements, and these indication signals are electrical compared with the control signals. Such checking systems really check that the printing elements have properly operated, but do not check the actual printing itself against the print controls.

SUMMARY OF THE INVENTION

The present invention basically contemplates, in printing apparatus using a transfer type ribbon, an arrangement which optically scans the ribbon after the printing operation to determine the characteristics of voids in the ribbon occurring as the result of the printing operation. Since such voids have unique patterns for each of the various characters, the character which was printed can be determined from the pattern, and checked against the print command. If there is a disagreement, then a printing error has occurred.

Accordingly, it is an object of the present invention to provide an improved system for checking the operation of printing apparatus of the type using a transfer type of ribbon.

Another object of the invention is to provide an improved error checking method and apparatus which comprises a simple and economical way of detecting printer errors.

A further object of the invention is to provide an improved error checking method and apparatus for checking the operation of printing apparatus of the type using a transfer type of ribbon, which checks the size and spacing of voids left in the ribbon by the printing operation.

The foregoing and other objects, features and advantages of the invention will be apparent from the following more particular description of a preferred embodiment of the invention, as illustrated in the accompanying drawings.

BRIEF DESCRIPTION OF THE DRAWINGS

Similar reference characters refer to similar parts in each of the several views.

DESCRIPTION OF THE PREFERRED EMBODIMENT

Figure 1:
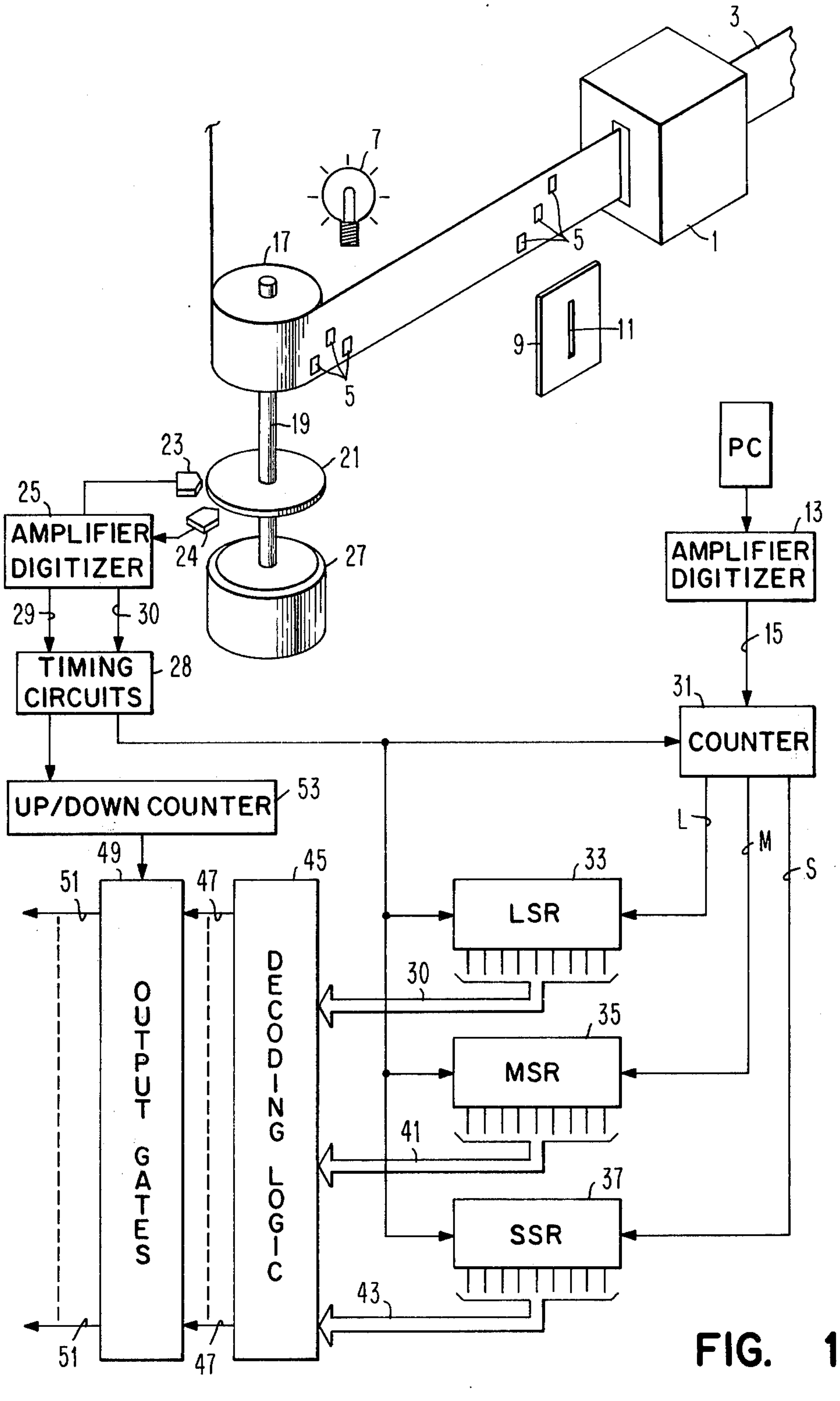
FIG. 1 is a schematic diagram of print checking apparatus in accordance with the preferred embodiment of the invention.

Referring to FIG. 1 of the drawings, there is shown in diagrammatic form one arrangement according to a preferred embodiment of the present invention. The reference character 1 designates a printing apparatus of conventional form which may use movable type elements or other electromechanical printing elements for printing on a document, not shown, and utilizing a transfer ribbon 3 in the usual form of an elongated web bearing pigment carrying material which is impacted against the document by the printing element to provide a printed indicia on the document.

In the printing operation, the impact of the ribbon on the document transfers a sufficient amount of the pigmented print material from the ribbon so that voids are left in the ribbon through which visible light can pass. Several such voids are shown at 5, in this instance being a variety of special symbols which are used for magnetic ink imprinting on bank checks, although the system is not limited to printing of that nature. Positioned on one side of the tape 3 at a location following the printing station 1 is a light source 7, which may be one or more incandescent bulbs, for example, that provide a strong source of light on the one side of the ribbon 3 carrying the voids 5 produced by the printing operation. On the opposite side of the ribbon, there is provided a mask 9, having a rectangular slit 11 therein.

A photoresponsive device PC is located in conjunction with the mask 9, slit 11 and light source 7 in such manner that light from the light source traveling through one of the voids 5 in ribbon 3 will be scanned by the slit 11 and cause a change in the amount of light falling on the photosensitive element PC.

The electrical signal output from the element PC is an analog quantity which is proportional to the size of the void with respect to the slit and the other optical considerations. In any event, the output signal is proportional to the amount of light coming through the voids and persists for a time which is proportional to the length of the void within a direction of travel of the tape 3. These signals are supplied to a conventional amplifier and digitizer circuit 13, to provide, on an output line 15, digital signals representative of the voids in the tape. The tape 3 is pulled by a capstan 17 which rotates in the direction shown, and is supplied therefrom to a take-up device not shown, such as a take-up spool. Mounted on the same shaft 19 with the capstan 17, is an encoder disk which may be of the optical or magnetic variety and this disk 21 is provided with pick-up heads indicated symbolically at 23 and 24, which supply a plurality of timing signals to the input of an amplifier and digitizer 25. Shaft 19 is rotated by a drive motor 27 as manifest from the drawings.

Digital output signals from the amplifier-digitizer 25 on the output lines 29 and 30 are therefore a measure of the velocity and displacement of the voids 5 occurring in the tape 3, as well as direction of movement, in view of the relationship of the drive mechanism parts and the encoder.

The signals from the encoder are supplied to a timing signal generator 28 which provides timing signals indicative of speed, direction and displacement of the tape 3. The timing signals thus generated are supplied to a first counter circuit 31, to thereby establish counts which are indicative of the length of the voids with respect to the tape. Counter outputs are provided which are designated as L, M and S for long, medium and short, respectively, so that the signals present on these lines from the counter 31 designate the presence of a void which meets certain minimum dimensions for each of the categories. The signals on the lines L, M and S are provided as inputs to corresponding shift registers 33, 35 and 37, designated as LSR, MSR and SSR, respectively.

The signals from counter 31 are entered serially at one end of the respective shift registers, and are shifted through by pulses supplied from the line 29 from the timing circuitry. Parallel outputs are taken from the stages of the shift register as shown symbolically by the multiple lines designated by reference characters 39, 41 and 43, and these signals are supplied to decoding logic 45 which decodes the various combinations of long, medium and short signals to thereby determine the value of the character represented by the voids in the tape.

The multiple outputs from the decoding logic 45 are supplied to output gates 49, from which they may be supplied on output lines 51 to any suitable utilization device.

Output gates 49 are governed by an up/down counter 53 in such manner that only when a character has been scanned with the tape moving in the forward direction and the trailing edge of a void is detected will an output be had on the lines 51. The up/down counter 53 is governed by signals from timing circuits 28.

Figure 2:
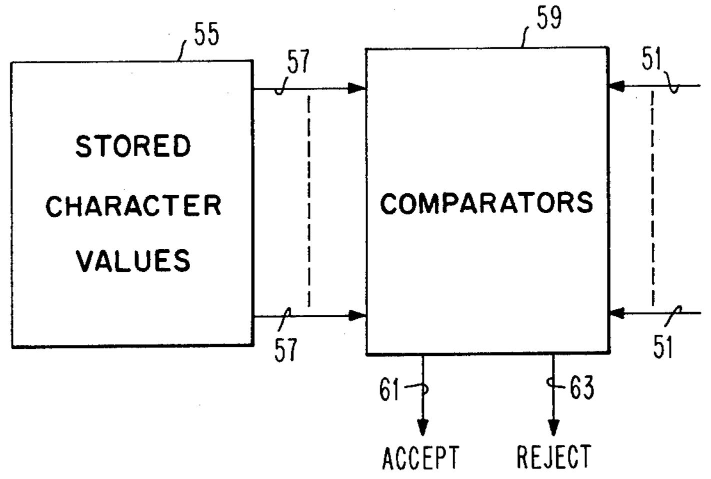
FIG. 2 is a schematic diagram showing how the character values obtained by scanning the voids can be compared with known values.

FIG. 2 shows the manner in which the value of the characters read by the apparatus of FIG. 1 may be checked against stored character values in a storage device 55. The output signals from the stored character values in storage 55 are supplied on lines 57 as one input to a plurality of comparators 59, the output lines 51 constituting the other input to the comparators. If the values read from the ribbon correspond to the stored character values, then an output signal will be present on the line 61, designated as "accept". If no match is found, then an output signal is present on line 63, designated as "reject".

Figure 3:
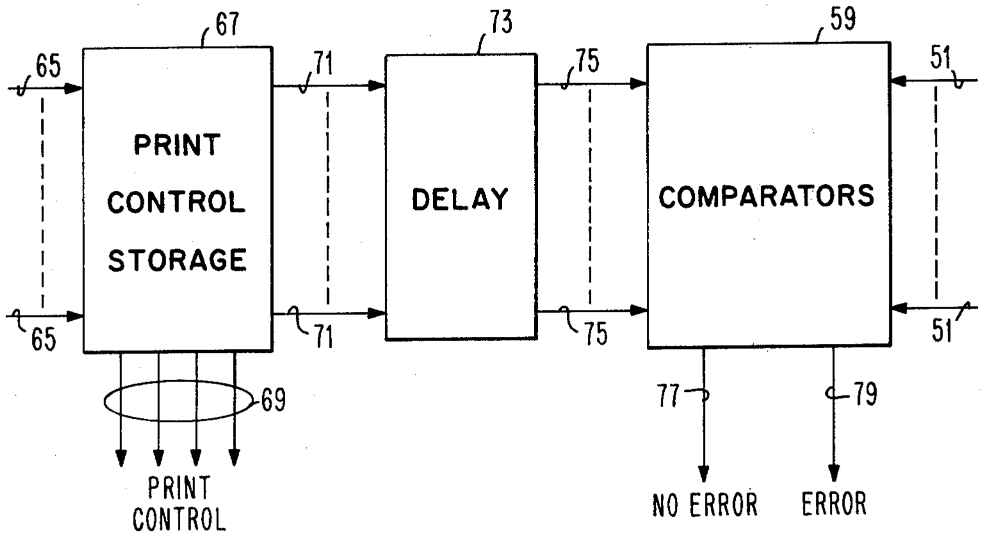
FIG. 3 is a schematic diagram showing how the character values obtained by scanning the voids can be compared with the character values which were to be printed.

FIG. 3 shows how the output signals 51 from the apparatus shown in FIG. 1 may be checked against the signals utilized to govern the operation of the printing device 1.

Print control signals supplied from a source, not shown, such as a data processor or input signal lines, are supplied on the input lines 65 of a print control storage unit 67 from whence signals are supplied on output lines 69 to the printer unit 1 for operating the printer unit to print the desired characters. At the same time, the signals are supplied on lines 71 through a delay device 73 and on lines 75 from the delay device to the input of the comparator 59. The purpose of introducing the delay into the supply of the print control signals to the comparators is to allow time for the printing to have taken place and for the resulting voids in the ribbon to have been scanned. If no error exists in the character printed, indicated by correspondence between the print control signals and the outputs on lines 51, then a signal designated "no error" is present on line 77. On the other hand, if the character printed as determined by scanning of the voids differs from the character which was to be printed as represented by the signals on line 65, then an output signal will be present on the line 79, designated as "error".

The single slit scanning arrangement shown in FIG. 1 is appropriate for bar-coded characters or stylized characters. Conventional characters would utilize a scanner of the electro-mechanical image dissector type, for example.

While the invention has been particularly shown and described with reference to a preferred embodiment thereof, it will be understood by those skilled in the art that various changes in form and details may be made therein without departing from the spirit and scope of the invention.

What is claimed is:

1. Error detecting apparatus for detecting errors in printing operations employing transfer printing ribbons, comprising, in combination,
   scanning means for scanning the ribbon following the printing operation and providing scanning signals indicative of the voids left in the ribbon by the printing operation, and
   analyzing means connected to said scanning means for determining the value of the character denoted by the scanned voids.

2. Error detecting apparatus for detecting errors in printing operations employing transfer printing ribbons, comprising, in combination,
   scanning means for scanning the ribbon following the printing operation and providing scanning signals indicative of voids left in the ribbon by the printing operation, and
   analyzing means connected to said scanning means for determining the validity of the printing operation by analyzing the parameters of the voids.

3. Error detecting apparatus as claimed in claim 2, in which said scanning means comprises optical means for scanning the voids.

4. Error detecting apparatus as claimed in claim 3, in which said optical means comprises a light source situated on one side of said ribbon, a mask disposed on the other side of said ribbon and having an aperture therein, and photoelectric means disposed to receive light from said source through the voids in the ribbon and said aperture in said mask.

5. Error detecting apparatus as claimed in claim 4, further characterized in that the aperture in said mask is rectangular, having its longest dimension perpendicular to the longest dimension of said ribbon.

6. Error detecting apparatus as claimed in claim 2, in which said analyzing means comprises measuring means for measuring the dimension of said voids along the length of said ribbon.

7. Error detecting apparatus as claimed in claim 6, in which said measuring means comprises a source of timing pulses, and a counter for counting said pulses only during the duration of a void.

8. Error detecting apparatus as claimed in claim 7, in which said counter provides output signals indicative of the length of the voids along the long dimension of the ribbon.

9. Error detecting apparatus for detecting errors in printing operations employing transfer printing ribbons in printing apparatus controlled by print control signals indicative of the characters to be printed, comprising, in combination,
   scanning means for scanning the ribbon following the printing operation and providing scanning signals indicative of the voids left in the ribbon by the printing operation, analyzing means connected to the scanning means for determining the value of the character denoted by the scanned voids, comparator means connected to receive said print control signals and connected to said analyzing means for comparing said print control signals and the outputs of said analyzing means, and comparator output means for indicating whether or not the output of said analyzing means corresponds to said print control signals.

10. Error detecting apparatus as claimed in claim 9 including delay means for delaying the supply of print control signals to said comparator means by a delay time corresponding to the delay between the operation of said printing apparatus and the supply of outputs from said analyzing means to said comparator means.

* * * * *